(12) United States Patent
Leason

(10) Patent No.: US 7,011,013 B2
(45) Date of Patent: Mar. 14, 2006

(54) ELECTRIC WOK HAVING FOOD PROCESSOR WITH AUTOMATIC FEED

(75) Inventor: David G. Leason, Chappaqua, NY (US)

(73) Assignee: Leason Holdings Company, LLC, Chappaqua, NY (US)

( * ) Notice: Subject to any disclaimer, the term of this patent is extended or adjusted under 35 U.S.C. 154(b) by 368 days.

(21) Appl. No.: 10/368,082

(22) Filed: Feb. 18, 2003

(65) Prior Publication Data

US 2004/0159244 A1    Aug. 19, 2004

(51) Int. Cl.
*A47J 37/10* (2006.01)
(52) U.S. Cl. .............................. 99/339; 99/348; 99/423
(58) Field of Classification Search ................. 99/339, 99/357, 348, 509, 510, 423, 537, 484
See application file for complete search history.

(56) References Cited

U.S. PATENT DOCUMENTS

| | | | |
|---|---|---|---|
| 3,805,687 A | 4/1974 | van de Klundert | 99/352 |
| 4,313,416 A | 2/1982 | Lau | 126/39 E |
| 4,359,935 A * | 11/1982 | Murray | 99/331 |
| 4,503,502 A * | 3/1985 | Chapin | 700/90 |
| 4,649,810 A | 3/1987 | Wong | 99/326 |
| 4,700,617 A | 10/1987 | Lee et al. | 99/327 |
| 4,919,950 A | 4/1990 | Mak | 426/233 |
| 5,010,805 A * | 4/1991 | Ferrara | 99/353 |
| 5,088,390 A | 2/1992 | Wong et al. | 99/327 |
| 5,129,314 A | 7/1992 | Hu | 99/422 |
| 5,289,760 A | 3/1994 | Barradas | 99/331 |
| D372,832 S | 8/1996 | Wong | D7/323 |
| 5,794,524 A | 8/1998 | Kemker et al. | 99/348 |
| 5,819,636 A | 10/1998 | Khashoggi | 99/326 |
| 6,367,371 B1 | 4/2002 | Ni | 99/348 |
| 6,499,391 B1 | 12/2002 | Su | 99/341 |
| 6,505,545 B1 | 1/2003 | Kennedy et al. | 99/331 |

* cited by examiner

Primary Examiner—Reginald L. Alexander

(57) ABSTRACT

A device for processing and cooking food comprises a base housing a heating element for a food cooking function and a controllable motor for a food processing function. A container seatable on the base has an inlet for introducing food and an outlet for processed food. A blade is rotatably mounted within the container and driven by the controllable motor to process any food that is introduced into the container. A removable pan is seatable on the base proximate to the heating element to define a cooking surface. The outlet is positioned relative to the removable pan so that any food introduced into the container exits the outlet directly onto the cooking surface. A spatula can be coupled to the base and positioned within the removable pan for movement across the cooking surface to stir the processed food as it is cooked. A method is also disclosed.

24 Claims, 5 Drawing Sheets

ELECTRIC WOK HAVING FOOD PROCESSOR WITH AUTOMATIC FEED

BACKGROUND OF THE INVENTION

1. Field of the Invention

The present invention relates generally to a food preparation method and system, and more particularly to an efficient method and system for processing and cooking food.

2. Description of the Related Art

A wide variety of food processing devices exist in the prior art including, for example, devices which can slice, chop, shred, puree or otherwise aid in the preparation of food products. Food processing devices permit individuals to prepare meals from fresh meats and vegetables instead of purchasing commercially prepared foods, which typically contain preservatives, fillers, and thickening agents.

Processing fresh food to create such meals, however, can be time-consuming and inefficient. Specifically, once the food is initially prepared, it frequently requires a separate cooking or heating step. Moreover, the extra cooking step involves the use of cookware and cooking utensils that must be cleaned once the processed food is served. Thus, there are benefits to providing a food preparation system that can both cook and process food to create a ready-to-eat food product.

Once such product is described in U.S. Pat. No. 6,505,545. That device utilizes a food processing container for both a food processing step in which a blade processes food and a cooking step in which a vapor is supplied into the container to steam the food. That arrangement, however, addresses a very limited range of cooking options.

One very desirable manner of cooking food employs a wok. A wok constitutes a very important part of Chinese cooking equipment that makes possible many delicacies. Basically, the wok takes the form of a shallow steel pan generally with a rounded bottom and diametrically opposite handles. Because of its steel construction, which is highly thermally conducting, and its shallow configuration, it distributes heat over a relatively wide area while concentrating liquid at the central or bottom portion. This arrangement permits a maximum of searing with a minimum of shortening which is very desirable for the stir and fry technique of Chinese cooking. Because the food ingredients are sliced, chopped, cubed or shredded, wok cooking takes only a few moments—three to ten minutes. By such rapid cooking, there is preserved the delicate flavor nuances lost in other cooking methods. However, in order to effectively cook with a wok, it is important that the cooking surface be elevated to a high temperature that is suitable for cooking food before introducing food into the wok.

In addition to the foregoing, a wok is a fairly flexible cooking utensil. Besides a stirrer-fryer it can serve as well as a griddle, omelet pan, roasting pan, soup kettle and so forth. It will work with a gas range or stove, an electric burner, or a charcoal fire.

It would be desirable to combine the flexibility of a wok with the functionality of a food processor to permit individuals to prepare a great variety of foods with efficiency and convenience. The present invention addresses this and other needs.

SUMMARY OF THE INVENTION

In accordance with one aspect of the invention, a method for processing and cooking food comprises providing a base that includes a heating element, a controllable motor, and a motor shaft driven by the controllable motor. The cooking surface is disposed on the base and is heated with the heating element to a temperature suitable for cooking the food. A container is seated on the base and has a lateral aperture proximate to and oriented toward the cooking surface. Food is introduced into the container. A blade within the container is rotated via a coupling to the motor-shaft to thereby process such food. The processed food is directed through the lateral aperture onto the heated cooking surface.

In a further aspect the foregoing method includes the additional step of moving a spatula about the cooking surface to thereby stir the processed food that has been directed onto the heated cooking surface. The spatula can be moved using the controllable motor or a second motor. When the controllable motor is used, the spatula can have a first coupling state in which the spatula is de-coupled from the motor shaft and a second coupling state in which the spatula is coupled to the motor shaft.

Methods that include a spatula with multiple coupling states preferably automatically change from the first coupling state to the second coupling state when the blade commences rotation. The spatula can continue to move about the cooking surface after the blade stops rotating. The spatula can be manually changed from the second coupling state to the first coupling state in order to stop its movement about the cooking surface.

In still further aspects, the foregoing methods can include the additional step of permitting the rotating step and any processing of food to occur only after the heating element has heated to the temperature suitable for cooking the food.

In accordance with yet another aspect of the invention, a device for processing and cooking food comprises a base which includes a heating element in support of a food cooking function and a controllable motor in support of a food processing function. A container is removably seatable on the base, the container having an inlet for introducing food and an outlet for processed food. A blade is rotatably mounted within the container and driven by the controllable motor to thereby process any food that is introduced into the container. A removable pan is seatable on the base proximate to the heating element to define a cooking surface. The outlet is positioned relative to the removable pan so that any food introduced into the container exits the outlet directly onto the cooking surface.

In a further aspect, the foregoing device further comprises features to implement the methods described above and herein. For example, the device can include a spatula positioned within the removable pan and coupled to the base for movement relative thereto; the spatula and the blade can be ganged to the controllable motor so that the spatula starts to move when the blade begins to rotate; and a temperature sensor can be connected to sense a temperature of the heating element with a switch or relay being operatively connected so as to permit the blade to rotate within the container only after a prescribed temperature has been sensed by the temperature sensor.

These and other aspects, features and advantages of the invention can be appreciated from the accompanying drawing figures and description of several illustrative embodiments.

DETAILED DESCRIPTION OF SEVERAL ILLUSTRATIVE EMBODIMENTS

By way of overview and introduction, the present invention concerns improvements in food processing and more particularly a system and method for processing, cooking, and, preferably, stirring while cooking, food with a single apparatus that coordinates the food processing and cooking operations so as to rapidly cook fresh ingredients with ease.

Figure 1:
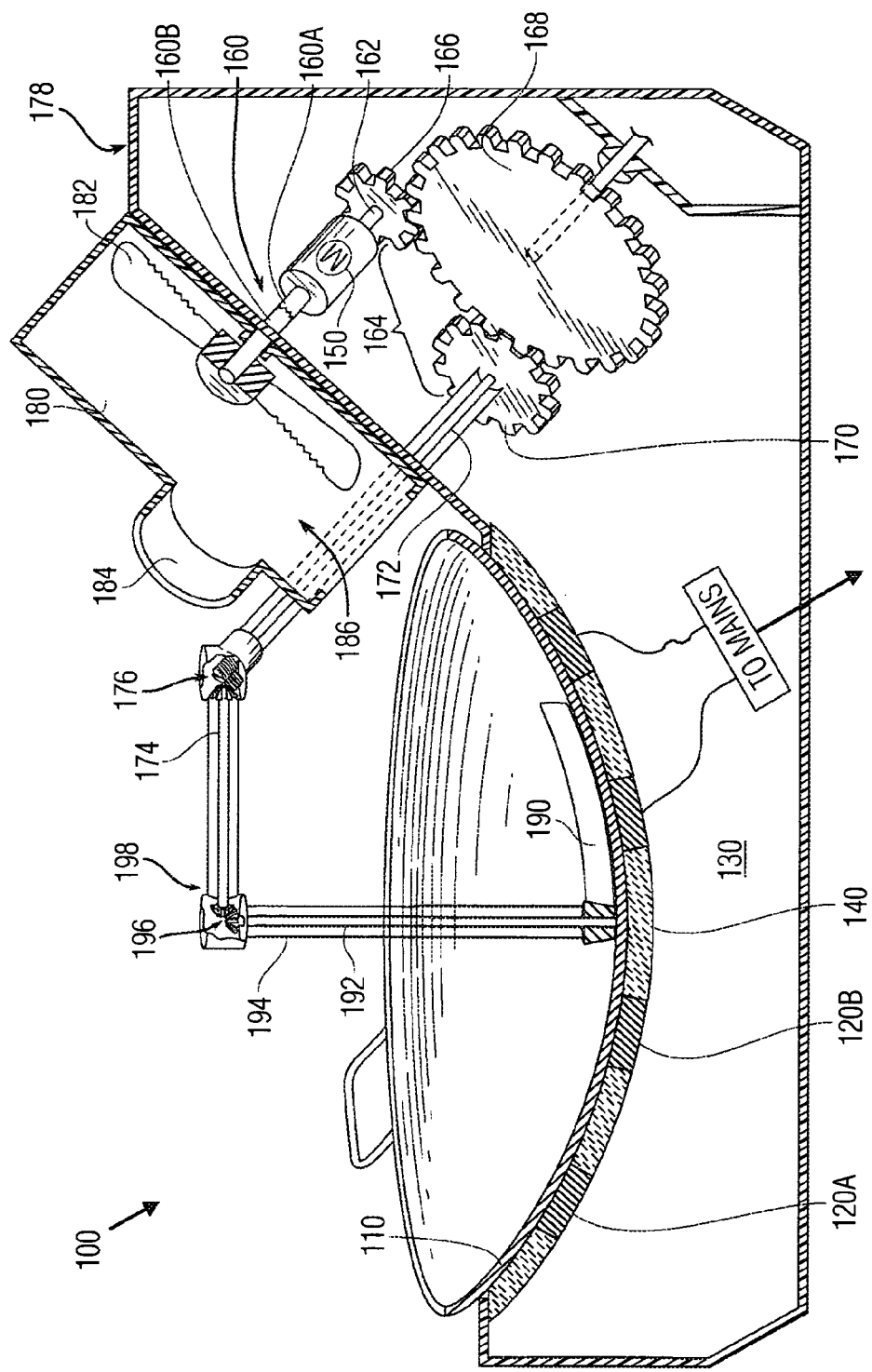
FIG. 1 is a sectional view, showing perspective in part, of a first embodiment of the present invention.

Referring now to FIG. 1, a first embodiment 100 is illustrated in which a wok pan 110 is seated in preferably abutting relationship with heating elements 120a, 120b. The wok pan 110 can be of conventional construction, for example, defining a shallow steel pan having diametrically opposite handles and a flat or convex (as shown) bottom surface. The heating elements can be electrically-resistive rings or can be a single element arranged in a spiral pattern, as disclosed in U.S. Pat. No. 4,313,416, the entirety of which is hereby incorporated by reference. Preferably, the heating elements 120a, 120b (more generally referred to herein as heating element 120) are arranged within a base unit 130 in a pattern that complements the outer contours of the wok pan 110. Thus, when the wok pan 110 is seated in the base 130, its bottom surface lies at a substantially uniform spaced relationship from the heater element(s). The handles permit ready removal of the wok pan for serving or cleaning; however, the pan can be locked to the base and require the release of a latch or other securement prior to removal.

The heating element 120 can be seated within a ceramic or heat conductive material 140. The heating element includes leads to a plug for connection to a mains supply (e.g., 120 Volt, 60 Hz power) provided through a standard household outlet. Typically, a fuse is in series with at least one of the leads.

Figure 6:
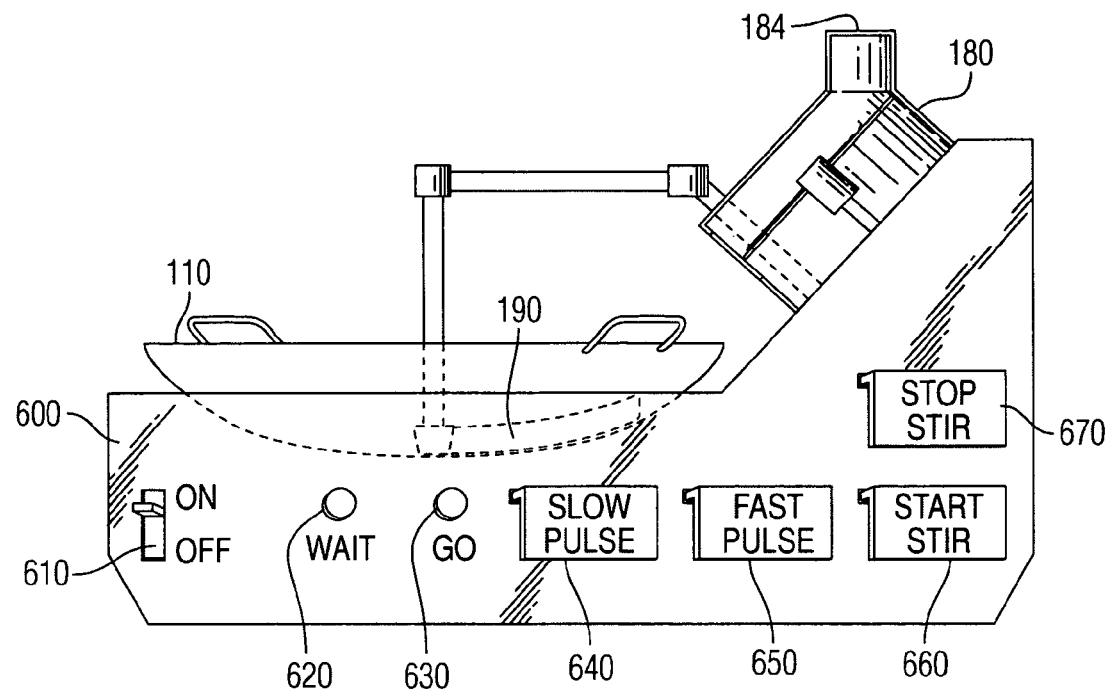
FIG. 6 is a front, plan view of the embodiment of FIG. 1 showing an illustrative control panel for initiating food processing, cooking and stirring operations.

The base 130 also houses a controllable motor 150 that is actuated via switches on an exterior surface of the base (see FIG. 6). The switches can control, among other operations, food-processing, cooking and stirring operations. For example, an individual can select among various food-processing operations by mounting a suitably configured blade (e.g. to slice, shred, cube or chop) and by activating the motor and turning a blade in a slow or fast, continuous or pulsed manner. In addition, a stirring feature can be combined with the food processing operation or used independent of (e.g., after) the food processing operation.

The motor 150 drives a motor-shaft 160 that protrudes from the base 130 onto a container-receiving deck 178. A container 180 can be seated on the deck 178 and can be provided with a variety of blades 182 to implement various different food-processing operations when the motor-shaft is driven to rotate the blade 182.

Food is introduced into the container 180 as is conventional with food processors through a top inlet or port 184. Food is forced through the port 184 by a complementarily shaped container insert, and urged against the blades 182. The blades process the so-introduced food in a variety of ways, such as by shredding or slicing. For some blades, rotational movement of the blade 182 can impart a centrifugal motion of the processed food and cause the food to move laterally. The container 180 is preferably provided with a lateral aperture 186, which is disposed proximate to and oriented toward the wok pan 110. Centrifugal movement of the processed food causes the food to be directedly ejected from the container through the aperture or outlet, once it has been processed, and deposited into the wok pan 110. Preferably, the deck 178 is canted or inclined relative to the bottom plane of the base (which is typically seated upon a table or counter) along with the container 180 to encourage gravitational flow of the processed food within the container 180 downward toward the aperture 186 and outward through the aperture.

Preferably, the embodiment 100 includes a temperature sensor (e.g., thermocouple) that prevents the blade 182 from rotating before the cooking surface (or heating element 120) reaches at least a prescribed temperature. This can be done either by disconnecting the motor 150 (e.g., via an internal switch (e.g., a relay) that renders inoperable any external blade controls (see switches 640 and 650 of FIG. 6) or by decoupling the shaft 160, such as by separating shaft portions 160a and 160b to thereby isolate portion 160b that drives the blade 182. This is preferred because it is not desirable to direct food to the cooking surface unless the cooking surface is already at a temperature suitable for cooking food. Indicators on the base advise the individual when the unit is ready to cook (i.e., the cooking surface has been heated to a temperature suitable for cooking the food) and thereafter permit the food processing and cooking operations to begin. A light can be provided on the base 130 that glows or glows a specific color (e.g., green) when the thermocouple detects that a threshold temperature has been reached, and at that time the blades can be rotated to process food and direct the processed food toward the cooking surface of the wok pan 110.

Stirring Operation

In the illustrated embodiment, the motor 150 drives a second shaft 162, which is coupled to a gear train 164 in order to drive a spatula 190 across the top of the cooking surface of the wok pan 110. More particularly, the shaft 162 is fixedly coupled to a drive gear 166 which turns an idler gear 168 which, in turn, rotates a gear 170 at the base of a sheathed spindle 172. The spindle 172 couples to an axle 174 via a worm gear or other coupling 176. The axle 174 transfers rotational energy from the shaft 162 to the spatula 190 via an arm 192 disposed within a rotationally stationary sheath 194 through a second worm gear arrangement or other coupling 196. This gear train arrangement ensures that food just ejected from the food processor onto the cooking surface is mixed and combined with any food previously ejected from the food processor onto the cooking surface; however, other arrangements can be utilized to provide a flexible drive for the spatula 190, such as the flexible drives used with electric drills to drive bits at an angle relative to the axis of the drill's drive.

Preferably, the drive for the spatula 190 (also referred to herein as the "stirrer-coupling") is flexible or can pivot relative to the base 130 so that the spatula can be lifted up from within and clear of the wok pan 110 to facilitate removal of the wok pan. Also, it is preferred that the spatula be de-coupleable from its drive, say, at a junction 198 to permit cleaning of that component.

Initially, the spatula does not move along the cooking surface, that is, it is decoupled from its driving motor and is hence in a first (non-moving) state. The stirring operation can be arranged to commence, and hence enter into a second (moving) state, automatically with the start of the food processing operation, and thereafter continue until halted manually by the user. In this way, stirring can continue after there is no more food to process and while the food cooks in the wok pan 110.

The stirring operation can be driven by a dedicated, second motor (not shown), in which arrangement there is no need for a gear or belt drive connection to the motor 150 used for the food processing operation. This alternative arrangement adds the complexity of a second motor, but simplifies the spatula's drive and permits the stirring operation to be controlled independent of the food-processing operation.

Figure 2:
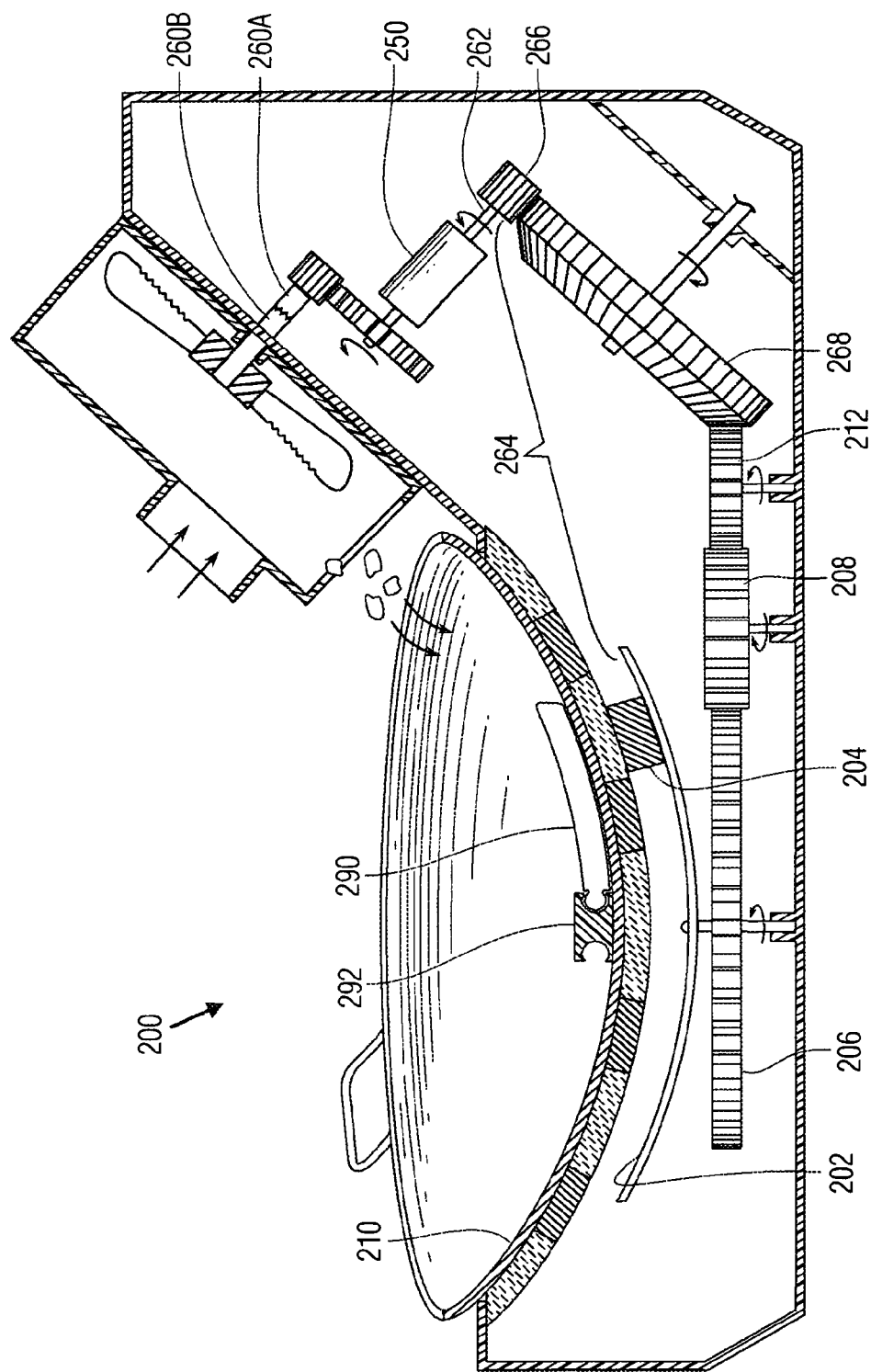
FIG. 2 is a sectional view, showing perspective in part, of a second embodiment of the present invention configured with one blade arrangement.

Referring now to FIG. 2 in which like components have been referenced with corresponding reference numerals, a second embodiment is illustrated in which a spatula 290 is driven by a gear train 264 by a magnetic coupling from below the wok pan 110. More specifically, a second shaft 262 is coupled to a drive gear 266 which turns an idler gear 268 which, in turn, rotates further gears 212, 208, 206 in order to rotate a permanent magnet 204, mounted on a concave face 202 of the gear 206. Thus, the motor 250 drives the gear 206 through the gear train 264 and causes the spatula 290 to rotate under the influence of the rotating magnet 204. The spatula pivots from a joint (e.g., a ball joint) about a center of the wok pan 210 within a raceway 292 attached to the pan in a conventional way (e.g., by a weld) or is integrally formed therewith. As in the previous embodiment, the gear train 264 can be driven independent of the shaft portion 160*b* to permit a stirring operation independent of any further food processing, that is, after there is no more food to process.

Figure 3:
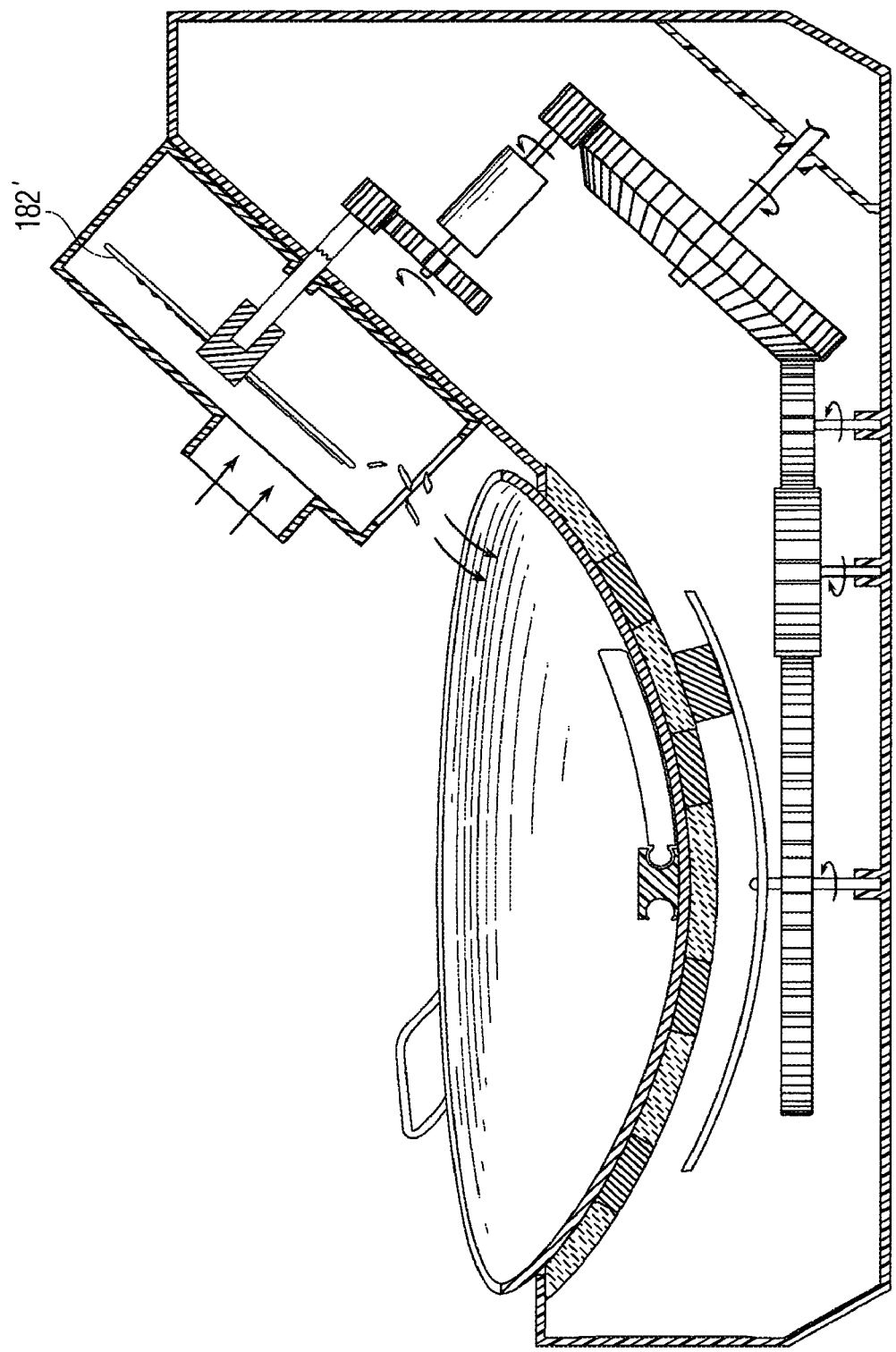
FIG. 3 is the sectional view of FIG. 2, now showing another blade arrangement.
Figure 5A:
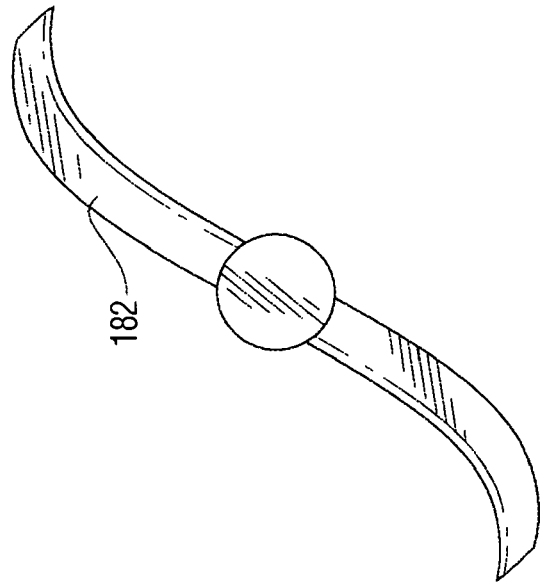
FIGS. 5a and 5b illustrate the blade arrangement from FIG. 2 in top plan and side plan views, respectively.
Figure 5B:
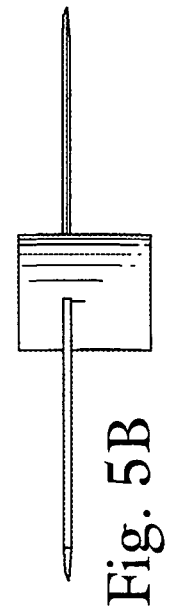
Figure 4A:
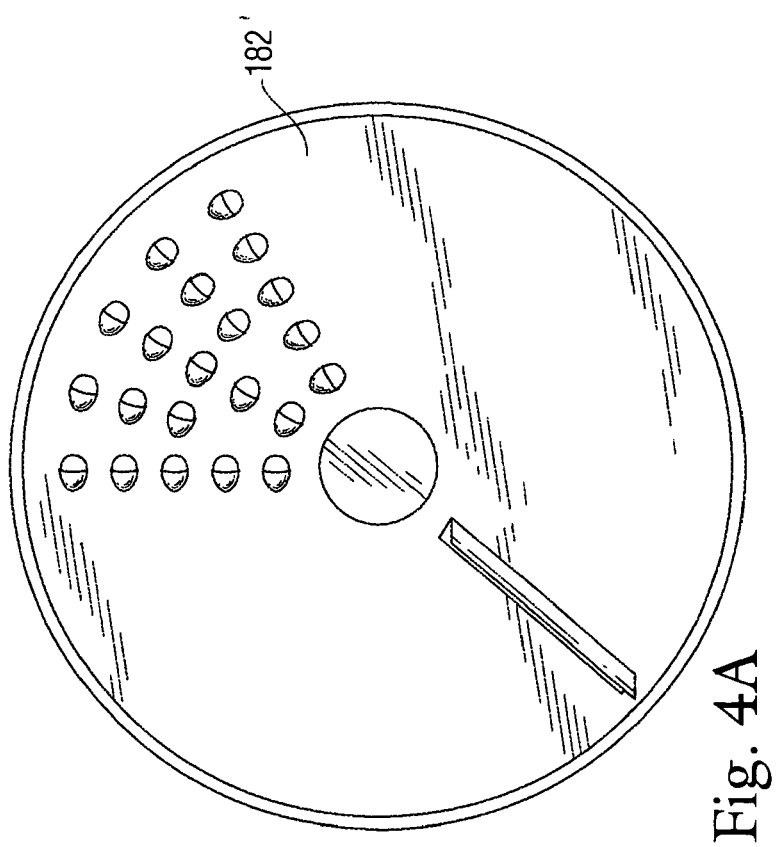
FIGS. 4a and 4b illustrate the blade arrangement from FIG. 3 in top plan and side plan views, respectively.
Figure 4B:
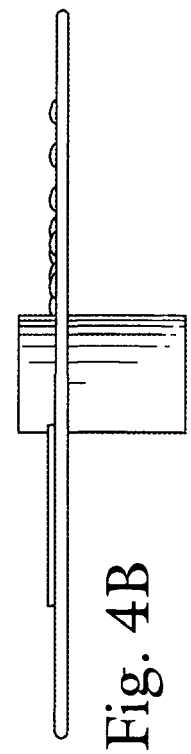

FIG. 3 illustrates the same embodiment as FIG. 2, but now shows a shredding and slicing blade instead of the chopping and cubing blade of FIG. 2. As is well understood in the art of food processing, variations in blade geometry result in food being processed into different sizes and shapes. FIGS. 4*a* and 5*a* illustrate two exemplary blades 182', 182 in top plan view, and FIGS. 4*b* and 5*b* show those same blades in side plan view.

FIG. 6 illustrates a control panel 600 that can be used in a physical embodiment of the invention, such as embodiments 100, 200. A power switch 610 supplies power to the heating element 120 and to the motor 150. During initial power-up and until the heating element reaches at least a threshold temperature, the device is in a "wait" state, as indicated by indicator 620 (e.g., a red LED). Once the threshold temperature has been reached, as determined by a thermocouple or other temperature-sensitive circuit or circuit element, the device shifts to a "go" state in which cooking and food processing operations can proceed. When the state changes, the indicator 620 extinguishes and a "go" indicator 630 illuminates (or provides an audible report such as a "beeping" sound).

Once the device is in the "go" state, the user can introduce food into the top port 184 of the container 180 and select a food processing mode such as slow or fast rotation of the blade 182. Paddle controls 640, 650 cause the motor-shaft 160 to be rotated at different speeds, for example, by providing different driving voltages to the motor 150. The voltage from the mains can be divided using a resistive voltage divider, for example, and the divided voltage used to energize the motor 150 at different rotational speeds, as understood by those of skill in the art. Alternatively, the speed of rotation of the shaft 160 can be varied using intervening gears or a belt drive.

Preferably, the paddle controls 640, 650 can be partially depressed for momentary contact to enable a temporary or pulsing cutting action of the blade 182 against any food introduced into the container, and fully depressed to a locked position for continuous rotation of the blade until the button is released.

As noted above, it is preferred that the stirring operation be commenced automatically when the blade is made to rotate, as this causes essentially immediate discharge of processed food into the wok pan 110. This can be achieved through a mechanical ganging of the paddles 640, 650 with a start-stir paddle 660, or through an (equivalent) electronic ganging of these two functions. The start-stir paddle 660 can be used to initiate the stirring operation independent of any food processing that the user requires. There is also a stop-stir paddle 670 that either decouples the shaft portion 160*b* or turns off the motor 150, so as to stop rotation of the spatula 190, 290. Preferably, the drive for moving the spatula engages and commences automatically with the start of any food-processing operation or when manually started, and continues until manually stopped.

Figure 7:
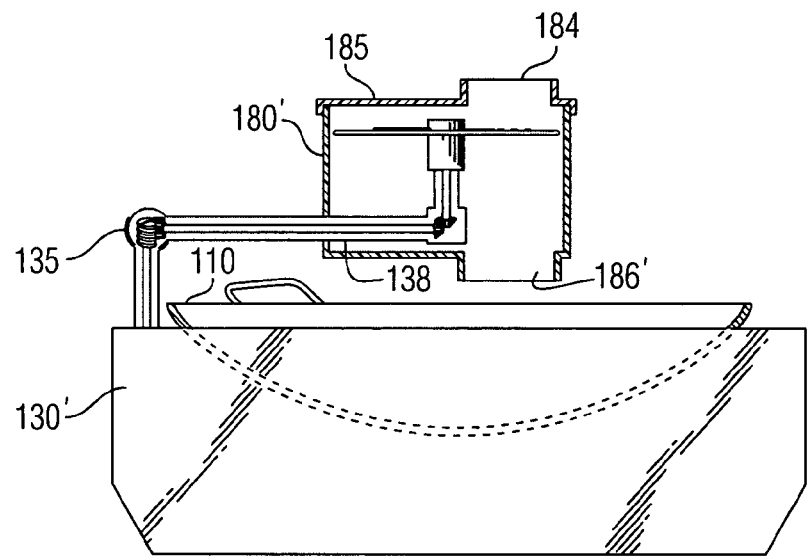
FIG. 7 is a sectional view of a third embodiment of the present invention configured with the food-processing container above the cooking surface.

FIG. 7 illustrates a third embodiment in which the container 180' is positioned above the wok pan 110. In this embodiment, food is again introduced into the container through port 184 but this time emerges from outlet 186' directly above the wok pan. Processed food drops from the container 180' directly into the pan. The base 130' contains gearing suitable for rotating the blade 182, such as through a flexible linkage 138, shown schematically. In addition, a hinge 135 permits the container 181 to be pivoted clear of the top of the wok pan 110.

The blade 182 can in other embodiments be driven to rotate directly within the wok pan 110, more preferably under a cover 185 (see FIG. 7) having an inlet port 184 for introducing food. The cover 185 is sized to seat on top of the wok pan 110. The blade can be driven in the same manner as the spatula of FIG. 1, and can be oriented in a first position for cutting food and in a second position for stirring food, if desired. For relevant teachings on positioning blades in a non-cutting position, see U.S. Pat. No. 6,505,545 which describes blades positioned so as to support food during a steaming operation. U.S. Pat. No. 6,505,545 is hereby incorporated by reference as if set forth in its entirety herein.

Induction Coil for Heating Element 120

As an alternative to the arrangements of the embodiments describe above, the heating element 120 can comprise a high temperature induction coil generally as described in U.S. Pat. No. 5,129,314, the entirety of which is hereby incorporated by reference. Briefly, if an induction coil is to be used, it is sandwiched between a heat conductive, electric insulating upper plate and an electrically insulating lower plate. The two free ends of the induction coil are joined to two copper plates which are disposed between the upper and lower plates. The copper plates are connected to two coils of connecting wire which have a length, thickness and width, such as 400 mm, 0.4 mm and 30 mm, respectively. The connecting wire can have a rectangular cross section. The free ends of the connecting wire extend out to connect an external power source that supplies electric power to the induction coil. A high temperature resisting adhesive, such as a silicone adhesive, is applied between the upper and lower plates to secure the assembly together for seating on the base 130 so that the upper, heat conductive plate contacts the underside of the wok pan 110 when the pan is seated in the base.

Preferably, the wok pan 110, the container 180, the blade 182 and the spatula 190 are constructed so as to be cleanable within a dishwasher at high water temperatures. That enables preparation and cooking of food with each of the components used in the process amenable to cleaning with minimal, manual effort.

Several of the features of one embodiment or arrangement described herein can be used in other embodiments or arrangements to equal advantage and the foregoing specification should be read with that understanding.

While the present invention has been described with respect to a certain embodiments thereof, it is not so limited. The detailed description is presented to enable one of skill in the art to practice the invention and to disclose the best mode known to the inventors as of the date of filing this patent application. The invention more broadly encompasses systems and methods defined by the recitations in the claims appended hereto and the equivalents of such recitations, and is not restricted to the description of any particular embodiment or alternative arrangement described herein.

I claim:

1. A device for processing and cooking food, comprising:
    a base which includes a heating element in support of a food cooking function and a controllable motor in support of a food processing function;
    a container removably seatable on the base, the container having an inlet for introducing food and an outlet for processed food;
    a food processing blade rotatably mounted within the container and driven by the controllable motor to process any food that is introduced into the container into different sizes and shapes than when introduced; and
    a removable pan scatable on the base proximate to the heating element to define a cooking surface;
    wherein the outlet is positioned relative tote removable pan so that any food introduced into tube container is processed by the blade and exits the container outlet directly onto the cooking surface in said different sizes and shapes than when introduced into the container.

2. The device of claim 1, further comprising a spatula positioned within the removable pan and coupled to the base for movement relative thereto.

3. The device of claim 2, further comprising a second motor, wherein the spatula is moved relative to the base by the second motor.

4. The device of claim 2, further comprising a coupling coupled to the controllable motor, wherein the spatula is moved relative to the base by the controllable motor through the coupling.

5. The device of claim 4, wherein the spatula and the blade are ganged to the controllable motor so that the spatula starts to move when the blade begins to rotate.

6. The device of claim 4, further comprising a switch operatively connected to the coupling to stop rotation of the spatula in response to manual actuation of the switch.

7. The device of claim 1, wherein the outlet is a lateral aperture positioned proximate to and oriented toward the cooking surface.

8. The device of claim 1, wherein the outlet is disposed above the removable pan and positioned to permit processed food to drop onto the cooking surface.

9. The device of claim 1, wherein the base includes an inclined surface sloped downwardly toward the removable pan, and wherein the container is removably seated on the inclined surface with the outlet oriented toward the removable pan.

10. The device of claim 1, further comprising:
    a temperature sensor connected to sense a temperature suitable for cooking food on the cooking surface; and
    one of a switch and a relay operatively connected to permit the blade to rotate within the container only after a prescribed temperature has been sensed by the temperature sensor.

11. The device of claim 10, further comprising:
    a spatula positioned within the removable pan and coupled to the base for movement relative thereto; and
    a coupling coupled to the controllable motor, wherein the spatula is moved relative to the base by the controllable motor through the coupling.

12. The device of claim 11, wherein the coupling comprises a selective coupling having a first coupling state in which the spatula is decoupled from the controllable motor and a second coupling state in which the spatula is coupled to the controllable motor.

13. The device of claim 12, wherein tube second coupling state subsists and the spatula continues to move about the cooking surface after the blade stops rotating.

14. The device of claim 11, wherein the spatula and the blade are ganged to the controllable motor so that the spatula starts to move when the blade begins to rotate.

15. The device of claim 11, further comprising a switch operatively connected to the stirrer-coupling to stop rotation of the spatula in response to manual actuation of the switch.

16. The device of claim 10, wherein the outlet is a lateral aperture positioned proximate to and oriented toward the cooking surface.

17. The device of claim 10, wherein the outlet is disposed above the removable pan and positioned to permit processed food to drop onto the cooking surface.

18. The device of claim 10, wherein like base includes an inclined surface sloped downwardly toward the removable pan, and wherein the container is removably seated on the inclined surface with the outlet oriented toward the removable pan.

19. The device of claim 10, further comprising a manual switch, accessible exteriorly of the base, configured to cause rotation of the blade within the container after said prescribed temperature has been sensed.

20. The device of claim 4, wherein the coupling comprises a selective coupling having a first coupling state in which the spatula is decoupled from the controllable motor and a second coupling state in which the spatula is coupled to the controllable motor.

21. The device of claim 20, wherein the second coupling state subsists and the spatula continues to move about the cooking surface after the blade stops rotating.

22. A device for processing and cooking food, comprising:
    a base which includes a heating element in support of a food cooking function and a controllable motor in support of a food processing function, the controllable motor having a motor shaft;
    a container removably seatable on the base, the container having an inlet for introducing food and an outlet for processed food;
    a food-processing blade rotatably mounted within the container and driven by the controllable motor to process any food that is introduced into the container into different sizes and shapes than when introduced;

a removable pan seatable on the base proximate to the heating element to define a cooking surface; and a user control operative to cause the motor shaft to rotate at different speeds;

wherein the outlet is positioned relative to the removable pan so that any food introduced into the container is processed by the blade and exits the container outlet directly onto the cooking surface in said different sizes and shapes than when introduced into the container.

23. The device of claim 22, further comprising:
a temperature sensor connected to sense a temperature suitable for cooking food on the cooking surface; and
one of a switch and a relay operatively connected to permit the blade to rotate within the container only after a prescribed temperature has been sensed by the temperature sensor.

24. The device of claim 23, wherein the user control is depressable to cause a pulsing cutting action of the blade.

* * * * *